(12) United States Patent
Brühwiler et al.

(10) Patent No.: US 8,899,908 B2
(45) Date of Patent: Dec. 2, 2014

(54) METHOD FOR CHECKING THE BEARING ALIGNMENT IN A GAS TURBINE

(75) Inventors: Eduard Brühwiler, Turgi (CH); Marc Rauch, Regenstorf (CH)

(73) Assignee: Alstom Technology Ltd., Baden (CH)

( * ) Notice: Subject to any disclaimer, the term of this patent is extended or adjusted under 35 U.S.C. 154(b) by 728 days.

(21) Appl. No.: 13/163,182

(22) Filed: Jun. 17, 2011

(65) Prior Publication Data

US 2011/0311352 A1    Dec. 22, 2011

(30) Foreign Application Priority Data

Jun. 17, 2010   (CH) ........................................ 0972/10

(51) Int. Cl.
*F01D 25/16*   (2006.01)
*F01D 21/00*   (2006.01)
*F02C 7/06*    (2006.01)

(52) U.S. Cl.
CPC .......... *F01D 21/003* (2013.01); *F05D 2260/80* (2013.01); *F02C 7/06* (2013.01); *F05D 2230/60* (2013.01); *F01D 25/166* (2013.01)
USPC ................. 415/1; 415/118; 415/127

(58) Field of Classification Search
USPC .................... 415/118, 127, 1; 416/61; 33/517
See application file for complete search history.

(56) References Cited

U.S. PATENT DOCUMENTS

| | | | |
|---|---|---|---|
| 3,447,244 A * | 6/1969 | Scholl | ............................ 33/796 |
| 2006/0217933 A1 | 9/2006 | Holi et al. | |
| 2007/0258669 A1 | 11/2007 | Lee | |

FOREIGN PATENT DOCUMENTS

| | | |
|---|---|---|
| DE | 20 2008 010 643 U1 | 10/2008 |
| GB | 344 669 A | 3/1931 |
| JP | 8-178609 A | 7/1996 |
| JP | 10-332305 A | 12/1998 |

OTHER PUBLICATIONS

Swiss Search Report for CH 9722010 dated Oct. 8, 2010.

* cited by examiner

*Primary Examiner* — Edward Look
*Assistant Examiner* — Juan G Flores
(74) *Attorney, Agent, or Firm* — Buchanan Ingersoll & Rooney PC

(57) ABSTRACT

The disclosure refers to a method and apparatus for checking the bearing alignment of a rotor of a gas turbine or steam turbine having a rotor with a radial offset and a radial offset surface and in a bearing shell, which supports the rotor, with a radial, at least in sections, end surface, wherein the radial offset surface and the radial end surface face the free end of the rotor. The radial offset is arranged in the bearing shell and offset towards the free end of the rotor. The degree of offset in the axial direction with regard to the rotor is measured at least two different circumferential positions around the rotor periphery in order to determine the alignment of the rotor. Differences in the degree of offset at different circumferential positions are used as measurement for the bearing alignment.

12 Claims, 4 Drawing Sheets

A – A

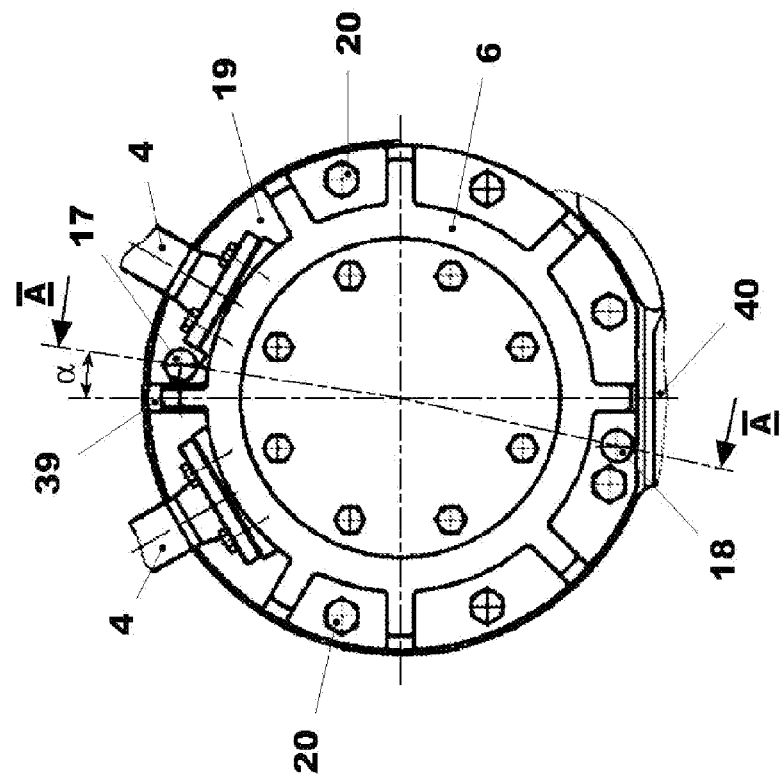
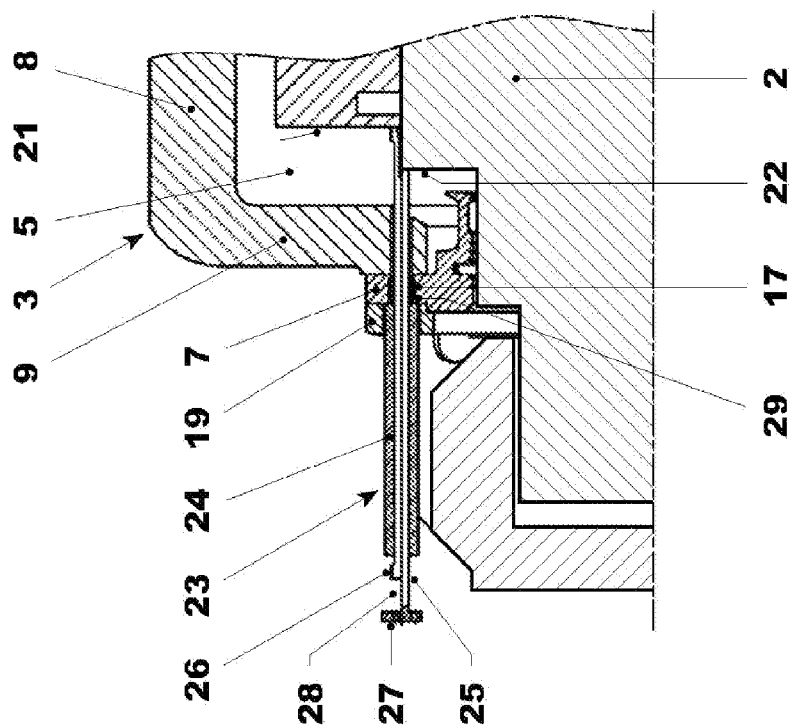
FIG. 2a
A–A
FIG. 2b

METHOD FOR CHECKING THE BEARING ALIGNMENT IN A GAS TURBINE

RELATED APPLICATION

This application claims priority under 35 U.S.C. §119 to European Patent Application No. 00972/10 filed in Switzerland on Jun. 17, 2010, the entire content of which is hereby incorporated by reference in its entirety.

FIELD

The disclosure refers to a method and apparatus for checking a bearing alignment of a rotor of a gas turbine or steam turbine, and to a design of a steam turbine or gas turbine.

BACKGROUND INFORMATION

A bearing arrangement of, for example, a journal bearing of large turbomachines can include a bearing housing and a bearing shell, an inner side of which is a contact point between rotating and stationary parts.

In order to safeguard a function of a hydrodynamic bearing arrangement during operation and in order to keep friction to a minimum during so-called rotor barring (slow rotation during a cooling down operation), the bearing shell and a bearing section of the rotor should be aligned accurately and parallel with each other.

The mutual aligning can be realized relatively simply by taking measurements during assembly when the bearing housing and a turbine casing are open. If, however, the bearing housing and the turbine casing are closed and bolted together, a deflection line of the turbine casing can be altered. As a result, the bearing housing and bearing shell can be rotated in relation to the rotor and the two components may no longer be parallel to each other. Therefore, the optimum functioning conditions may no longer be fulfilled.

In order to ensure that the bearing shell can be aligned correctly in relation to the rotor, the positions in relation to each other are measured before and after closing the bearing cover and turbine casing. In known methods this has been done by four measuring points at a 12 o'clock position, the measuring being carried out in the radial direction. When the machine is closed, there is no longer access to such measuring points. As a result, information about possible incorrect positioning is hard to determine. It should be added that measuring on a relatively rough (outer wall of the bearing shell) and convex surface (bearing shell, rotor) can be inaccurate. Experience has shown that such measurements are not sufficiently reliable.

SUMMARY

A method is disclosed for checking a bearing alignment of a rotor of a gas turbine or steam turbine, for a rotor arranged in a bearing shell and having a radial offset and a radial offset surface, and the bearing shell, with a radial end surface, at least in sections supporting the rotor, the radial offset surface and the radial end surface being arranged at a free end of the rotor, the method comprising: measuring a degree of offset in an axial direction of the rotor, between the radial offset surface and the radial end surface at least two different circumferential positions around a rotor periphery, and using differences in the degree of offset at the at least two different circumferential positions as measurements to determine the alignment of the rotor relative to the bearing shell.

A gas turbine or steam turbine is also disclosed, comprising a bearing housing including a cavity, at least one bearing shell arranged in the cavity of the bearing housing, a turbine rotor supported in the at least one bearing shell, and through-holes made at different circumferential positions for measuring, in a radial wall of the bearing, which faces a free end of the rotor for measuring a degree of offset of the rotor relative to the bearing shell.

A measuring device for measuring a degree of offset to check a bearing alignment of a gas or steam turbine comprising: at least one first rod-like element, including a first end for, the measuring device to axial contact with an offset surface of a rotor; and at least one second element, movably supported with regard to the first element, and including a first end for axial contact with a radial end surface of a bearing shell, wherein a degree of offset can be determined via an offset of the first element in relation to the second element.

BRIEF DESCRIPTION OF THE DRAWINGS

Exemplary embodiments of the disclosure are described in the following text with reference to the drawings which only serve for explanation and are not to be construed as being limiting. In the drawings:

FIG. 2(a) shows a plan view in the axial direction towards a rotor end of a cover of a bearing housing according to an exemplary embodiment of the disclosure;

FIG. 2(b) shows an axial section through the bearing region of an exemplary embodiment of a gas turbine with an exemplary embodiment of a measuring device inserted;

DETAILED DESCRIPTION

Figure 1:
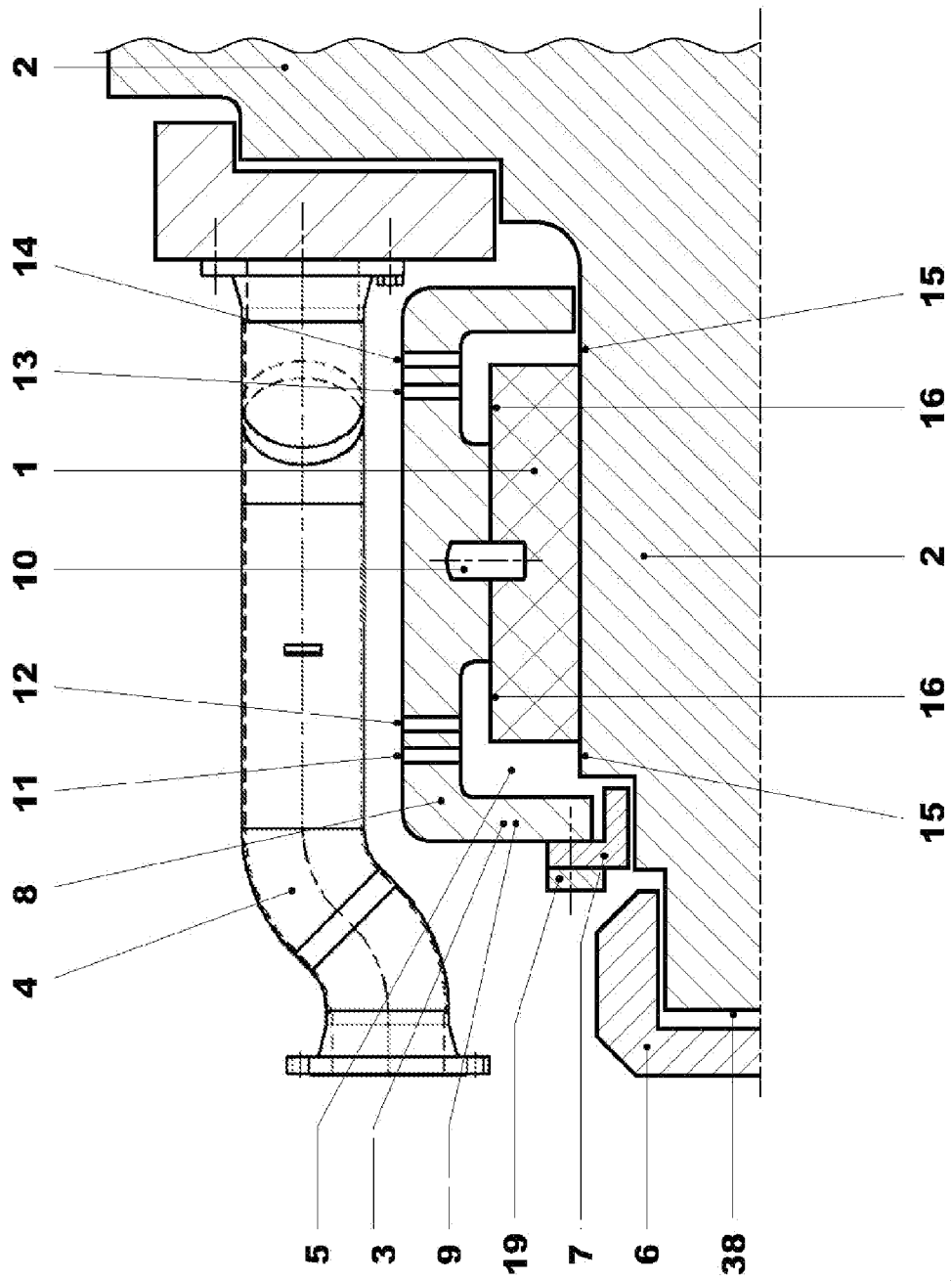
FIG. 1 shows an axial section through a bearing region of a rotor of a known gas turbine.

The present disclosure relates to a method and apparatus for checking the bearing alignment of a rotor of a gas turbine or steam turbine. The disclosure provides a gas turbine or steam turbine which is correspondingly designed for implementation of the method.

The method is provided for a gas turbine or steam turbine with a rotor with a radial offset and a radial offset surface, and with a bearing shell, supporting the rotor, with a radial, at least in sections, end surface. In this case, these two surfaces can be aligned perpendicularly to the axis of the rotor, and the radial offset surface and the radial end surface can both face a free end of the rotor. On this free end of the rotor, provision can be made for additional elements. The radial offset in this case can be arranged in the bearing shell and can be offset towards the free end of the rotor (by 2-40 cm, for example).

According to an exemplary embodiment of the disclosure, a degree of offset in an axial direction between the radial offset surface and the radial end surface with regard to the rotor can now be measured at least two different circumferential positions around the rotor periphery in order to determine the bearing alignment of the rotor. Differences in a degree of offset at different circumferential positions can be used as a measurement for the bearing alignment. With the disclosed method, measuring can therefore be carried out directly on an end face of the rotor or on the bearing shell. In so doing, only two instead of four measuring points can be used. Measuring can be more accurate because it is carried out directly between rotor and bearing shell (smooth, machined surfaces). The measuring points can be easily accessible with the machine closed. A corresponding measuring rod can be used.

For measuring, two axial measuring holes at an upper and lower position can be used. For example by means of a measuring rod with a slide, carrier, hand grip and sliding grip, the nominal measurement (degree of offset) can be determined. The two measurements at the upper and lower positions provide conclusions about the parallelity of the bearing shell in relation to the rotor (because the rotor edge/offset surface like the bearing shell end face/radial end face can be precisely at right angles to the bearing surfaces). In an exemplary case, the two measurements at the upper and lower positions can be substantially identical. Accordingly, manipulations on the entire installation can then be undertaken in order to ensure that the two measurements at the upper or lower position (or at other or additional positions) are substantially identical. Such a correction can be carried out in two or more steps (measuring-adjusting-measuring-adjusting, etc.) while applying the method.

In contrast to known methods, in which the relative positions of bearing shell and rotor in a radial direction are determined and therefore, for example, in the case of the rotor, a distance to a concave surface is measured, which can be inaccurate, the present disclosure discloses measuring in the axial direction, wherein use is made of two surfaces which, at least in that section in which measuring is carried out, are formed as planes which can be essentially parallel and oriented perpendicular to the rotor axis. This can allow a more accurate determination of the relative position of bearing shell and rotor.

According to an exemplary embodiment of the proposed method, the procedure in this case can be carried out in such a way that a first circumferential position of measuring the degree of offset is selected in an upper position, for example within an angular range of +/−30° around the 12 o'clock position (as seen in the axial direction with regard to the rotor), and a second circumferential position of measuring the degree of offset is selected in a lower position, for example within an angular range of +/−30° around the 6 o'clock position. Because the alignment problems can arise as a result of the bearing shell being able to deviate with regard to the rotor, for example, in the horizontal longitudinal axis (corresponds to the rotor axis), these two positions can lead to desired measuring sensitivity. For practical reasons, in this case the corresponding measuring point, which is designed in the form of a specifically provided hole, or simply a flange hole from which the corresponding threaded element has been removed, is not selected exactly at the 12 o'clock and 6 o'clock positions because at these positions other constructional elements, such as fastening elements, ventilation ducts, etc., are frequently arranged.

The procedure can be carried out in such a way that the two different circumferential positions for measuring the degree of offset are arranged substantially opposite, for example, exactly opposite, as seen around the periphery of the rotor.

In principle, it is possible to undertake measuring at two different circumferential positions which are substantially opposite, as mentioned above. However, in order to ensure that all possible rotations of bearing shell in relation to the rotor can also be sensitively measured, three or four (or even more) different circumferential positions can also be used for measuring the degrees of offset. In this way, it is possible for example to take measurements at approximately the 12, 3, 6 and 9 o'clock positions.

In the case of such a gas turbine or steam turbine, the bearing shell can be arranged in a cavity of a bearing housing. Measuring can be carried out by means of axial holes, provided at different circumferential positions, in an substantially radial (that is to say oriented perpendicularly to the axis of the rotor) wall of the bearing housing which is at the position of the hole and normally faces the free end of the rotor.

Figure 3:
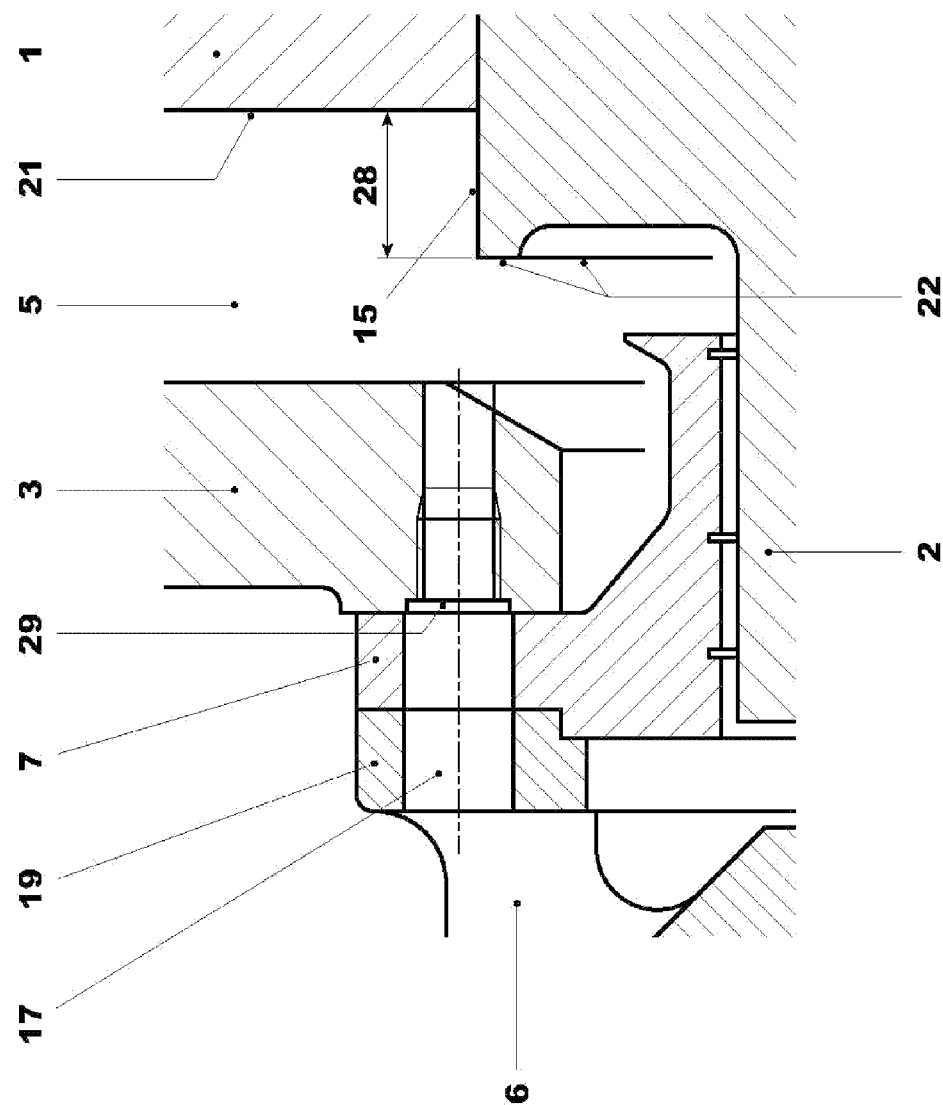
FIG. 3 shows in a detailed view an axial section in the region of the through-opening for the exemplary embodiment of the measuring device.

Furthermore, direct measuring with a depth gage is also possible, wherein a corresponding bearing surface then has to be made outside the connecting flange (see connecting flange 19 in FIG. 3).

The degree of offset can be determined by these holes, using different devices. Thus, for example the use of optical measuring devices is possible, which sequentially or in parallel with two measuring beams (for example laser beams) determine the two surfaces or their relative axial spacing. Such a device, after opening the hole, for example, can be seated over the hole or with a collar can be partially inserted into the hole.

Alternatively, it is possible to undertake measuring of the degree of offset using a mechanical measuring device, for example by using a rod-like device which has at least one first element which is brought into axial contact with the offset surface, and also at least one second element which is movably mounted with regard to the first element and which is brought into axial contact with the radial end surface. The degree of offset can then be determined, via the offset of the first element in relation to the second element, either with elements, which are on the opposite ends projecting from the bearing housing, being inserted into the bearing housing (determining the measurement with the device inserted), or else the device can be removed from the bearing housing. Care should be taken that the two elements do not shift in relation to each other, and the degree of offset can be determined, via the offset of the first element in relation to the second element, at the tip of the elements where contact with the surfaces had been made. For simplification, provision can be made in this case on the corresponding sections for scales on the elements or on additional components which carry these.

The bearing shell, in the case of such gas turbines or steam turbines, as explained above, can be arranged in a cavity of a bearing housing, and measuring can then be undertaken by means of holes, provided at different circumferential positions, in a radial wall which faces the free end of the rotor, by the first element and the second element being inserted by a first end, in each case, in the axial direction into a hole, by the first element being brought into contact with the offset surface and the second element being brought into contact with the radial end surface. If desired, the relative position of the first element to the second element can be fixed, for example by using a screw which is located outside the bearing housing at this measuring position, and the relative position can be used as a measurement for the degree of offset.

Measuring the degree of offset can be carried out at a point which is as close as possible to the circumferential surface of the rotor which runs in the bearing shell. Accordingly, measuring the degree of offset can be carried out at an exemplary radial position of less than 10 mm, for example less than 5 mm, radially outside a circumferential surface of the rotor in the bearing region with regard to the radial end surface and with corresponding measurements taken inside with regard to the offset surface. The procedure can be carried out in such a way that measuring the degree of offset can be carried out by the axial position of the radial offset surface, which is adjacent to the circumferential surface of the rotor in the bearing region, being measured at a position which is inwardly offset by, for example, less than 10 millimeters (for example, less than 5 mm), with regard to the radius of the circumferential surface of the rotor, and the radial end surface being correspondingly measured with as little as possible inward offset. This can be achieved by a device, as mentioned above, with a first and a second element being used, by the first element being movably supported on or in the second element, and by the rod-like second element essentially being guided so that during measuring it comes to lie with one surface in contact with or very close to the circumferential surface of the rotor.

The turbine can have a rotor which is supported in at least one bearing shell. The bearing shell can be arranged in a cavity of a bearing housing. At different circumferential positions provision can be made for through-holes for measuring, which are to be opened, in a radial wall of the bearing housing which faces the free end of the rotor.

Furthermore, the present disclosure relates to a measuring device for implementing the exemplary methods, for example in a gas turbine or steam turbine, as is described further above. The device includes at least one first rod-like element, the first end of which can be brought into axial contact with the offset surface. The device includes at least one second rod-like element which is movably supported with regard to the first element (for example supported in or on the first element— for example in the form of a slide rail but it is also possible to enable a direct supporting via a third component), and its first end can be brought into axial contact with the radial end surface. In this case, the degree of offset can be determined via the displacement-wise offset of the first element in relation to the second element. For making determination of the degree of offset easier, provision can be made for means which are to fix the relative position of the first element in relation to the second element, for example in the form of a screw (such as a knurled screw) which is arranged at the measuring position outside the bearing housing and fixes this relative position. Furthermore, at least one position which is arranged outside the bearing housing during the measuring process (that is to say in the case of elements which are inserted into the hole), provision can be made on the first element and/or on the second element and/or on an additional carrier element which carries these elements, for a scale, via which the relative position of the elements can be read. It is also possible to provide such a scale on the ends of the elements which come into contact with the offset surfaces but such a scale can only be read when the device has been removed again from the bearing housing.

FIG. 1 shows an axial section through the bearing region of the rotor of a gas turbine. The rotor 2 in this case, in the bearing region, has a cylindrical section, the circumferential surface 15 of which can be successively stepped towards the free end 38. In this region, the circumferential surface 15 is arranged in a bearing housing 3. In this bearing housing 3, there is a cavity 5 in which the actual bearing shell 1 can be fastened via fastening elements 10. The bearing shell 1 has a central cylindrical recess in which the rotor 2 can be rotatably supported, for example, via slide bearings. In this case, the rotor 2 rotates on an oil film in the bearing shell. Oil can be in the cavity 5, and towards the free end the bearing housing is closed off via a radial wall 9, whereas circumferentially it is closed off via the circumferential wall 8. Towards the free end, the region which encompasses the rotor is closed off by an oil scraper element 7 and an end element 6. In this region, moreover, cooling air lines 4 can be arranged, and also additional elements, which is why this bearing region is accessible to only a limited extent.

As explained above, the relative orientation of bearing shell 1 and rotor 2 is beneficial for a trouble-free, efficient operation of the turbine. If the bearing shell 1 and rotor 2 are arranged coaxially in the bearing region this can result in a trouble-free operation. In the case of known bearing arrangements, the procedure for checking the relative position of bearing shell 1 and rotor 2 is correspondingly carried out with the aid of measuring holes 11-14, provided specifically for it, which run radially and through the circumferential wall 8 of the bearing housing.

For this purpose, provision is made for a front rotor measuring hole 11 and a front bearing-shell measuring hole 12. In the right-hand region, on the other side, provision is made in the circumferential wall 8 for a rear bearing-shell measuring hole 13 and a rear rotor measuring hole 14. In this case, the rotor measuring hole 11, 14 is arranged in each case so that it aligns with an exposed region of the circumferential surface 15 of the shaft or of the rotor, while the bearing-shell measuring hole 12, 13 is arranged in each case so that it aligns with an exposed region of the radial outer side 16 of the bearing shell 1.

For measuring the relative position of rotor 2 and bearing shell 1, in this case the procedure is then carried out in such a way that with the aid of measuring rods inserted into the measuring holes 11-14 the offset between the surfaces 15 and 16 is measured both at the front as well as at the rear. If the rotor 2 and the bearing shell are arranged substantially coaxially, then the offset both at the front, measured via the holes 11 and 12, and at the rear, measured via the holes 13 and 14, is the same. With this method or with measuring with the aid of such holes 11-14, the holes 13 and 14 are not accessible without parts of the gas turbine having to be removed. Moreover, the radial outer side 16 and the circumferential surface 15 are convex surfaces, and accordingly measuring with a contact point on such a convex surface can be inaccurate.

With the aid of FIGS. 2-4, an exemplary measuring method according to the disclosure will be described. Like designations in these figures generally refer to the same or at least functionally identical elements. Measuring is not carried out in the radial direction but rather in the axial direction. Moreover, the circumferential surface 15 is not measured relative to the radial outer side 16 which is relatively far away from it but rather is measured quite close to the determining point.

The rotor 2 has a radial tapering, (e.g., a radial offset), directly next to a radial end surface 21 of the bearing shell. At this point, there is correspondingly a radially extending (e.g., arranged perpendicularly to the axis of the rotor) offset surface 22. The radial end surface 21 is also arranged perpendicular to the axis of the rotor.

If a comparison is made between a measurement taken at an upper position and a measurement then taken at a lower position, the offset between the offset surface 22 and the end surface 21 is a measurement for accuracy of the relative alignment of rotor 2 in relation to bearing shell 1. In order to enable such measuring in the axial direction, provision is made in the end element 6 in the connecting flange 19 for an upper axial measuring hole 17 and a lower axial measuring hole 18, as can be seen particularly in FIG. 2a. The upper axial measuring hole 17 in this case is arranged as close as possible to the 12 o'clock position 39, and the lower axial measuring hole 18 lies exactly opposite and therefore in its turn is close to the 6 o'clock position 40. The offset angle α in this case is selected as small as possible or even 0, it being different from 0 in this case because bracing elements are arranged exactly at the 12 o'clock position 39 and at the 6 o'clock position 40.

Shown in FIG. 2b is how a measuring device 23 for measuring the offset 28 between the radial end surface 21 and the radial offset surface 22 is inserted through the upper axial measuring hole 17. The device in this case has a sleeve 24 which is inserted into the region of the hole 17 which runs through the flange 19. The sleeve 24 comes into contact with that section of the hole 17 which extends through the oil scraper 7. As can be seen particularly with reference to FIG. 3, the hole 17 has a tapering specifically at this point, which serves as a stop 29 for the sleeve 24. Therefore, the measuring device can be fixed in the axial direction and in a defined position.

In this sleeve 24 two elements can be arranged which are movably supported relative to each other and relative to the sleeve 24. An outer element, or in this case an upper element, in the form of a measuring rod 26 is provided for the bearing housing position, specifically for determining the contact against the radial end surface 21 of the bearing shell 1. Radially further inwards, or in this case below and directly adjacent, a further measuring rod 25 is arranged for determining the rotor position. The end of this second measuring rod 25, which projects into the cavity 5, comes into contact with the radial offset 22.

If the two elements 25 and 26 have now been brought into contact with the surfaces 22 and 21, as is shown in FIG. 2b, then with corresponding length adjustment of the two rods 25 and 26, the degree of offset in the axial direction between the two surfaces 22 and 21 can be read outside the bearing housing 3, specifically between a grip 27, which is provided on the other end of the measuring rod 25, and the other end of the measuring rod 26, which also projects from the bearing housing 3, for the bearing shell position. The degree of offset 28, for example, if a scale is also provided on the upper side of the measuring rod 25, can therefore be read directly outside the bearing housing, and therefore determined, with the measuring device inserted. Because the two measuring rods 25 and 26 slide directly one upon the other and are arranged adjacently to each other, if desired even mounted one inside the other in the form of slide rails, the underside (or radially inner side) of the measuring rod 26, comes essentially into contact with the circumferential surface 15 and therefore, as close as possible to this circumferential surface, comes into contact with the radial end surface 21. On the other side, the end of the measuring rod 25, as far on the outside as possible, comes into contact with the radial offset 22. In this way, optimum accuracy of measuring the degree of offset 28 can be made possible.

The combination of the measuring rods 25 and 26 allows that for each measuring point only one hole has to be provided for guiding through the measuring rods 25, 26. The measuring rods 25 and 26, which slide inside each other, furthermore allow the use of a small hole with a diameter of less than, for example, 25 mm, preferably, for example, even of less than 10 mm.

Figure 4:
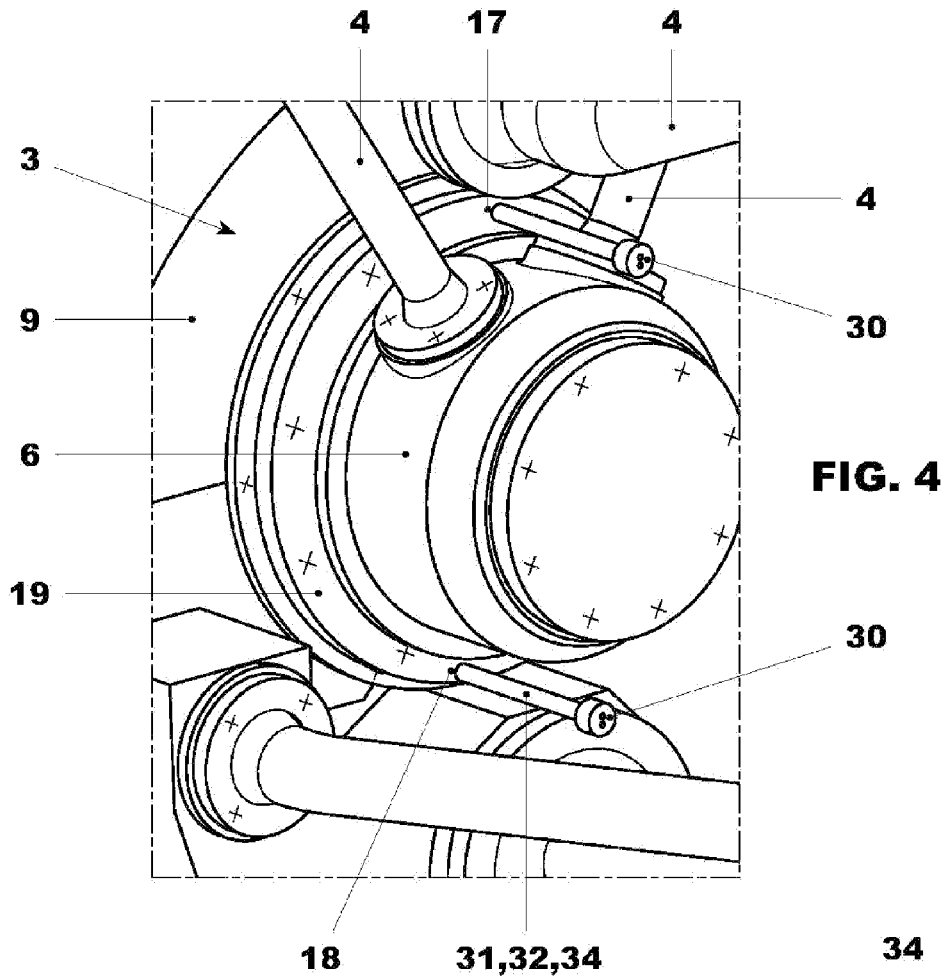
FIG. 4 shows a perspective view towards the rotor end of the cover of a bearing housing according to an exemplary embodiment with an exemplary embodiment of a measuring device inserted in the upper opening and an exemplary embodiment of a measuring device inserted in the lower opening.
Figure 5:
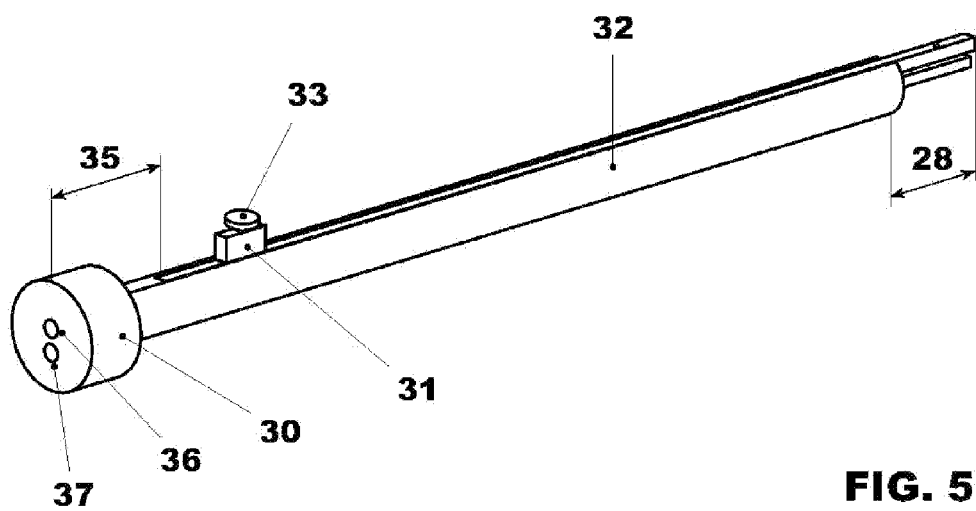
FIG. 5 shows a perspective view of the exemplary embodiment of the measuring device.

In FIGS. 4 and 5, an exemplary embodiment is shown in the inserted state through the lower hole 18 and upper hole 17. The device includes a carrier 32 and a slide 34. The device does not have a third element in the sense of the sleeve 24 described above in the case of the previous embodiment because with the end of the carrier 32, which is shown in FIG. 5 on the right hand side, the contact against the surface 22 can be directly measured, and with the free end of the slide 34, the position of the surface 21 can be measured. The slide 34 can be in the form of a T-profile, wherein a protrusion is formed on the stop end which is shown in FIG. 5 on the right, i.e. a region in which a part of the slide 34, as a clearly defined stop point, projects slightly beyond the rest of the slide. The slide 34 can be movably guided in a groove in the essentially cylindrically formed carrier 32. On its end which projects from the bearing housing during the measuring process, the carrier 32 has a hand grip 30. A fastening hole 37 for the carrier 32 is provided in this hand grip 30. Moreover, provision is made for a measuring hole 36 which aligns with said groove and extends essentially axially.

So that the slide 34 in the carrier 32 can be fixed in the determined displacement position in which the carrier 32 is in contact with the surface 22 and the slide 34 is in contact with the surface 21, provision can be made for a sliding grip 31 with a knurled screw 33. The knurled screw 33 allows the slide 34 to be fixed in the carrier 32 and so to establish the relative position.

Such a device can be inserted so the carrier 32 is brought into contact by its right-hand end with the surface 22 and the slide 34 is brought into contact by its right-hand end with the surface 21, wherein for displacement the sliding grip 31 can be used, then the knurled screw 33 can be tightened down and the device removed from the bearing housing 3 again. The degree of offset 28 can then simply be measured at the right-hand end, as shown by the arrow 28. In order to make this easier, it is possible to provide a scale on the slide 34. However, it is also possible to read the degree of offset with the device inserted, specifically with the corresponding design of the length of the slide 34, the degree of offset can be measured or read directly at the point represented by the designation 35. It is also possible in this case, via a corresponding scale on the carrier 32, to read the degree of offset directly but it is also possible to insert a depth measuring rod through the measuring hole 36, which is already mentioned above, and to correspondingly determine the degree of offset by means of the hole 36 in the groove in which the slide 34 is guided.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF DESIGNATIONS

1 Bearing shell
2 Rotor
3 Bearing housing
4 Cooling air line
5 Cavity in 3
6 End element
7 Oil scraper
8 Circumferential wall of 3
9 Radial wall of 3
10 Fastening of 1 in 3
11 Front rotor measuring hole
12 Front bearing-shell measuring hole
13 Rear bearing-shell measuring hole
14 Rear rotor measuring hole
15 Circumferential surface of 2 in the bearing region
16 Radial outer side of 1 in 5
17 Upper axial measuring hole
18 Lower axial measuring hole
19 Connecting flange of 6
20 Fastening screw 21 Radial end face of 1
22 Radial offset, offset surface of 2
23 Measuring device
24 Sleeve
25 Measuring rod for rotor position
26 Measuring rod of bearing shell position
27 Grip
28 Degree of offset
29 Stop for sleeve
30 Hand grip
31 Sliding grip
32 Carrier
33 Knurled screw
34 Slide
35 Displayed degree of offset
36 Measuring hole in 30
37 Fastening hole for carrier
38 Free end of the rotor
39 12 o'clock position
40 6 o'clock position
α Offset angle

What is claimed is:

1. A method for checking a bearing alignment of a rotor of a gas turbine or steam turbine, for a rotor arranged in a bearing shell and having a radial offset and a radial offset surface, and the bearing shell, with a radial end surface, at least in sections supporting the rotor, the radial offset surface and the radial end surface being arranged at a free end of the rotor, the method comprising:
   measuring a degree of offset in an axial direction of the rotor, between the radial offset surface and the radial end surface at at least two different circumferential positions around a rotor periphery; and
   using differences in the degree of offset at the at least two different circumferential positions as measurements to determine the alignment of the rotor relative to the bearing shell.

2. The method as claimed in claim 1, comprising:
   selecting a first circumferential position of measuring the degree of offset in an upper position, within an angular range of +/−30° around a 12 o'clock position; and
   selecting a second circumferential position of measuring the degree of offset in a lower position, within an angular range of +/−30° around the 6 o'clock position.

3. The method as claimed in claim 1, comprising:
   arranging the at least two different circumferential positions to be substantially opposite, as seen around the periphery of the rotor.

4. The method as claimed in claim 1, comprising:
   measuring at least three or four different circumferential positions for measuring the degree of offset.

5. The method as claimed in claim 1, comprising:
   arranging the bearing shell in a cavity of a bearing housing; and
   providing holes for measurement at different circumferential positions, in a radial wall of the bearing housing which faces the free end of the rotor.

6. The method as claimed in claim 1, comprising:
   measuring the degree of offset using a rod-like device which has at least one first element which is brought into axial contact with the offset surface, and also at least one second element which is movably supported with regard to the first element and which is brought into axial contact with the radial end surface; and
   determining the degree of offset is via the offset of the first element in relation to the second element.

7. The method as claimed in claim 6, comprising:
   arranging the bearing shell in a cavity of a bearing housing;
   providing holes for measurement at different circumferential positions in a radial wall which faces the free end of the rotor;
   inserting the first element and the second element by respective first ends in the axial direction in respective holes;
   bringing the first element into contact with the offset surface;
   bringing the second element into contact with the radial end surface; and
   using a relative position of the first element to the second element as measurement for the degree of offset.

8. The method as claimed in claim 1, comprising:
   measuring the degree of offset with regard to the radial end surface at a radial position of less than 10 mm, radially outside a circumferential surface of the rotor in the bearing region.

9. The method as claimed in claim 1, comprising:
   measuring a degree of offset by an axial shaft measuring hole in a circumferential wall of the bearing housing.

10. The method as claimed in claim 1, comprising:
    arranging the bearing shell in a cavity of a bearing housing;
    providing holes for measurement at different circumferential positions in a radial wall which faces the free end of the rotor;
    inserting a first element and a second element by respective first ends in the axial direction in respective holes;
    bringing the first element into contact with the offset surface;
    bringing the second element into contact with the radial end surface; and
    using a relative position of the first element to the second element as measurement for the degree of offset.

11. The method as claimed in claim 1, comprising:
    measuring the degree of offset with regard to the radial end surface at a radial position of less than 5 mm, radially outside a circumferential surface of the rotor in the bearing region.

12. A gas turbine or steam turbine comprising:
    a bearing housing including a cavity;
    at least one bearing shell arranged in the cavity of the bearing housing;
    a turbine rotor supported in the at least one bearing shell; and
    through-holes made at different circumferential positions, in a radial wall of the bearing, which faces a free end of the rotor for measuring a degree of offset of the rotor relative to the bearing shell.

* * * * *